United States Patent [19]

Witte

[11] Patent Number: 4,934,670
[45] Date of Patent: Jun. 19, 1990

[54] MAGNETIC CHUCK FOR CHUCKING OR LIFTING WORKPIECES

[75] Inventor: Horst Witte, Bleckede, Fed. Rep. of Germany

[73] Assignee: Horst Witte Entwicklungs-und Vertriebs KB, Bleckede, Fed. Rep. of Germany

[21] Appl. No.: 393,224

[22] Filed: Aug. 14, 1989

[30] Foreign Application Priority Data

Sep. 9, 1988 [DE] Fed. Rep. of Germany ....... 3830685

[51] Int. Cl.$^5$ .................... B23Q 3/154; B25B 11/00
[52] U.S. Cl. .................................... 269/8; 269/21
[58] Field of Search .................. 269/8, 21; 51/235; 294/64.1; 279/3; 335/289, 290

[56] References Cited

U.S. PATENT DOCUMENTS

| | | | |
|---|---|---|---|
| 3,330,754 | 7/1967 | Trager | 269/8 |
| 3,787,039 | 1/1974 | Zeichman | 269/21 |
| 4,139,051 | 2/1979 | Jones et al. | 269/21 |

FOREIGN PATENT DOCUMENTS

| | | |
|---|---|---|
| 3237102 | 7/1982 | Fed. Rep. of Germany . |
| 3503210 | 1/1985 | Fed. Rep. of Germany . |
| 59-192432 | 10/1984 | Japan ........... 269/8 |
| 63-212428 | 9/1988 | Japan ........... 269/8 |

*Primary Examiner*—Robert C. Watson
*Attorney, Agent, or Firm*—Staas & Halsey

[57] ABSTRACT

The magnetic chuck for chucking or raising workpieces has differently poled (S and N) magnetic pole pieces (1), between which is located a pole pitch (2) of non-ferromagnetic material. In order to make the magnetic chuck more universally usable for workpieces made from non-magnetizable or weakly magnetizable material, it is additionally constructed as a vacuum chuck. This is brought about by correspondingly differently designed bores or slots, which are preferably filled with sintered metal and by means of which the vacuum is applied through corresponding vacuum lines. Due to the fact that the magnetic force and/or the force applied by the vacuum is available as a retaining or holding force, a universal use of the same tool is possible and simultaneously a considerable holding force can be applied.

7 Claims, 5 Drawing Sheets

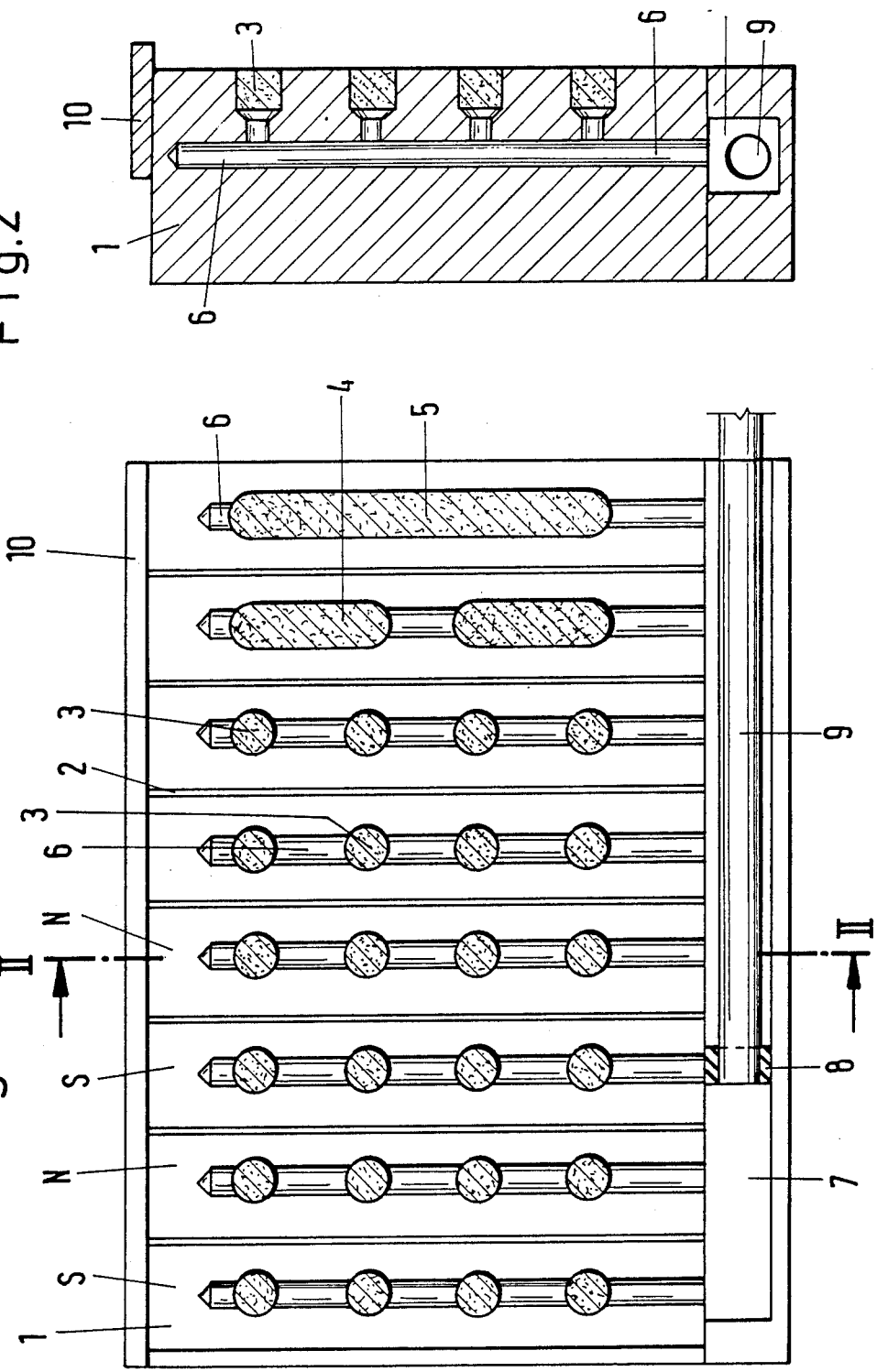

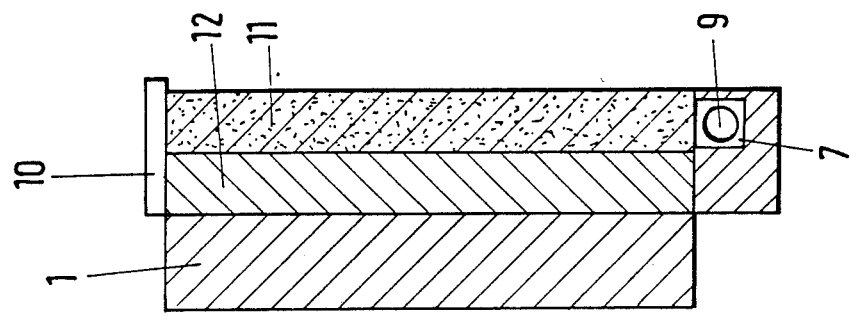
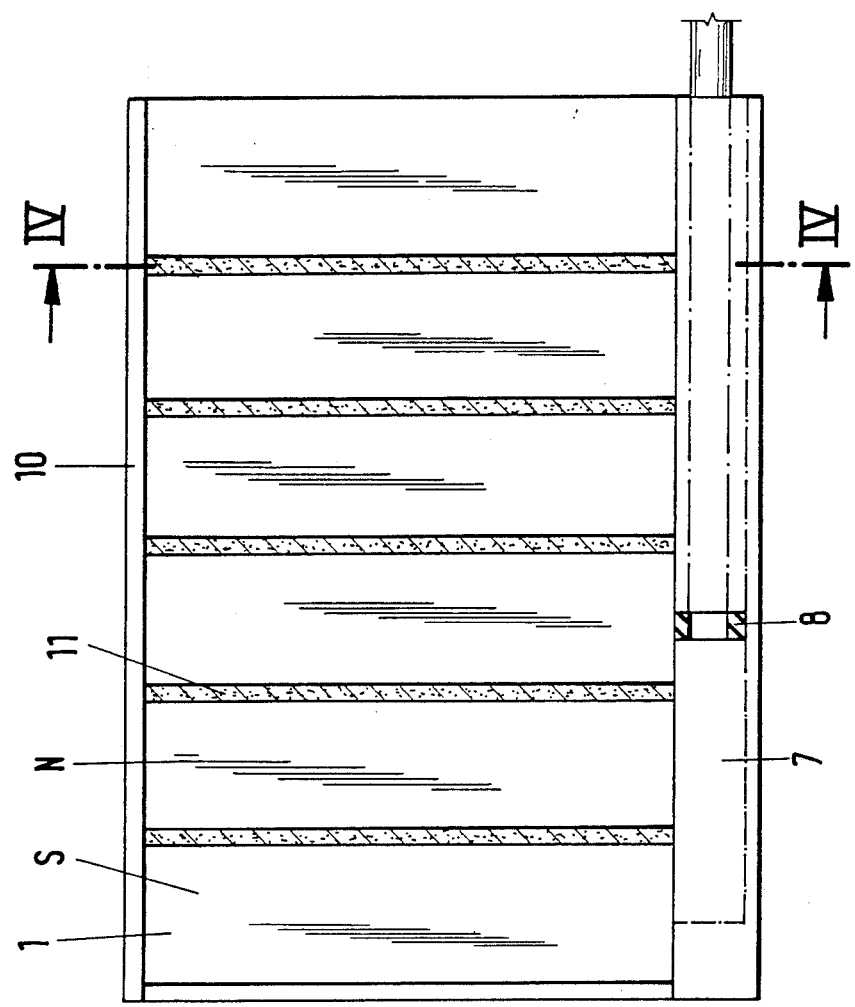

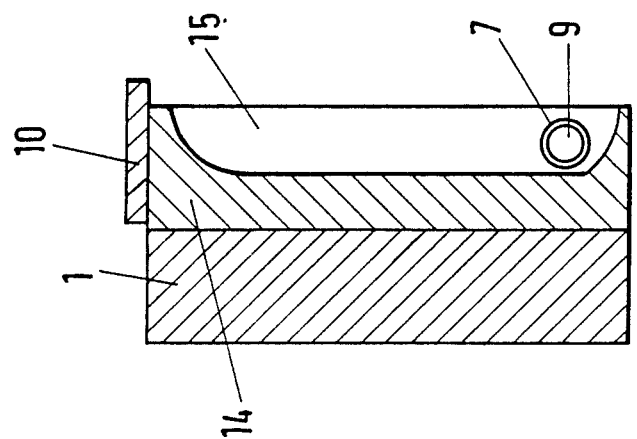
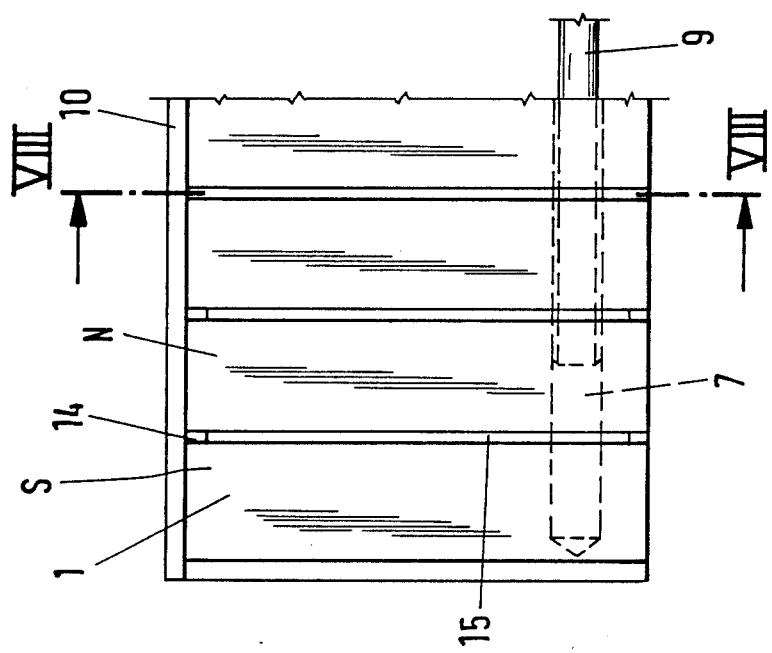

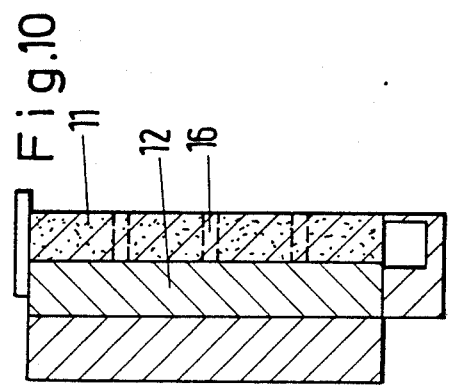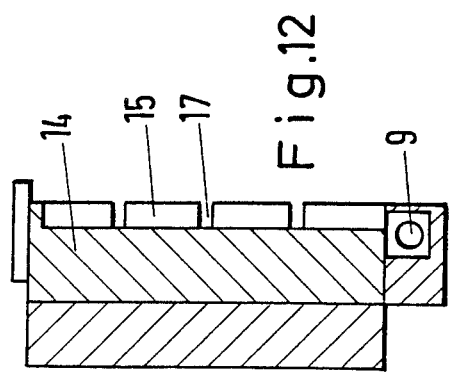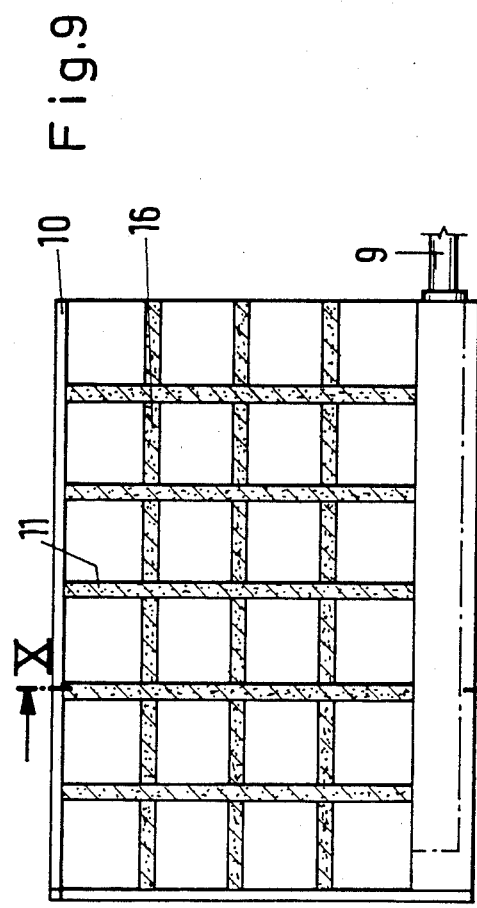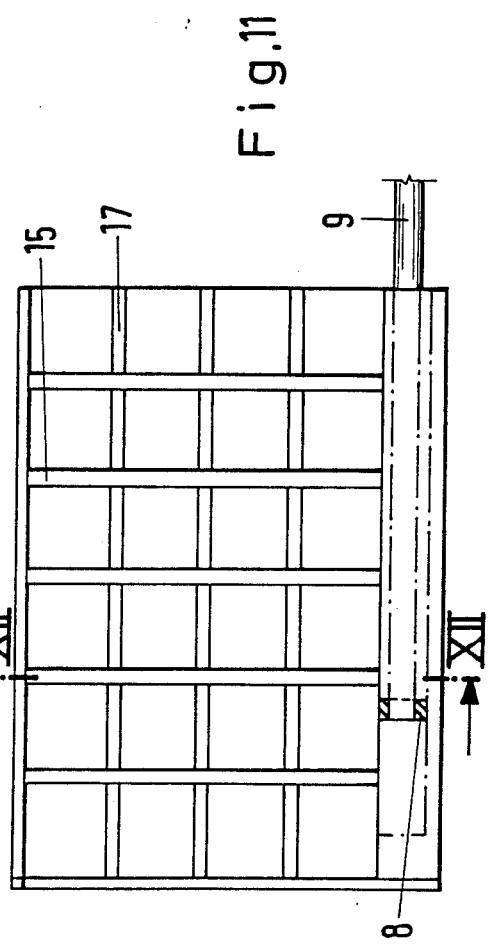

MAGNETIC CHUCK FOR CHUCKING OR LIFTING WORKPIECES

BACKGROUND OF THE INVENTION

The invention relates generally to a magnetic chuck.

German patent 35 03 210 discloses a chucking device in the form of a combination of a magnetic chuck and a vacuum chuck. The chuck is made from non-ferromagnetic material and contains bores, which are connected to a vacuum collecting line, so that the vacuum can be transferred to the workpieces. The smooth chuck surface is interrupted by the bore openings therein. In the case of sensitive workpieces, this can cause damage, because relatively large portions, namely the openings are present, where the workpiece is not supported.

SUMMARY OF THE INVENTION

An object of the present invention is to provide a magnetic chuck of the aforementioned type, which can reliably hold workpieces made from different materials, including weakly magnetic or non-magnetic materials, but whose surface is designed in such a way that the workpiece is supported at all points, while providing a reliable, good transfer of vacuum through the use of an unimpeded air passage.

Thus, according to the invention two constructions are possible. In one embodiment the slots or bores are formed in the magnetic pole pieces between the pole pitches comprising non-ferromagnetic material and are filled with fine-pored sintered metal. In the other embodiment the slots are provided in the pole pitches and once again filled with fine-pored sintered metal, which is in this case not ferromagnetic.

This leads to a particularly effective chucking device in the form of a combination of vacuum chuck and magnetic chuck. In addition, the bores or slots provided for vacuum transfer purposes are once again "filled", the material (sintered metal) being air-permeable, so that a reliable transfer and application of the vacuum is permitted. However, no "weak points" are formed, at which the workpiece is not supported. This is important in the case of thin, soft and high-grade workpieces. Otherwise such workpieces cannot be chucked, or this can only take place with a risk of damage.

BRIEF DESCRIPTION OF THE DRAWINGS

The invention is described in greater detail hereinafter relative to nonlimitative embodiments and the attached drawings, in which:

FIG. 1 is a plan view of three different embodiments of a chuck according to the invention, the three only slightly differing embodiments being represented in one drawing;

FIG. 2 is a sectional view taken along line II—II of FIG. 1;

FIG. 3 is a plan view of another embodiment of a chuck according to the invention;

FIG. 4 is a sectional view taken along line IV—IV of FIG. 3;

FIG. 7 is a plan view of another embodiment of a chuck according to the invention;

FIG. 8 is a sectional view taken along line VIII—VIII of FIG. 7;

FIG. 9 is a plan view of another embodiment of a chuck according to the invention;

FIG. 10 is a sectional view taken along line X—X of FIG. 9;

FIG. 11 A plan view of another embodiment of a chuck according to the invention;

FIG. 12 is a sectional view taken along line XII—XII of FIG. 11.

DETAILED DESCRIPTION OF THE PREFERRED EMBODIMENTS

Figure 6:
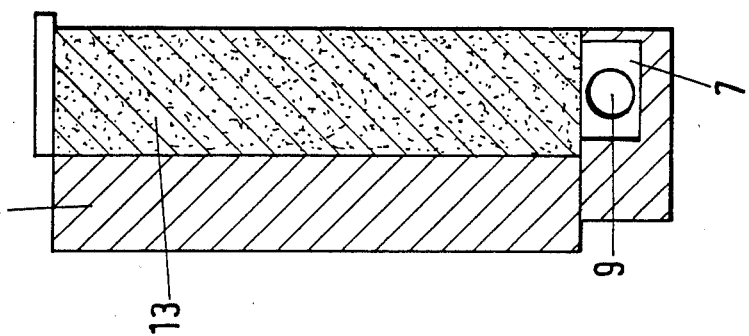
FIG. 6 is a sectional view taken along line VI—VI of FIG. 5.

The magnetic chuck shown in the drawings is basically constructed in the same way as known magnetic chucks. The individual pole pieces are designated 1, the north and south polarity alternating and being designated N and S.

FIG. 1 shows three similar embodiments. Vertical bores 3 or slots 4, 5 are provided in the bearing or chucking surface and are connected to vacuum connection lines 6, in each case in the magnetic pole pieces 1. The bores 3 or varying long slots 4 or 5 are filled with fine-pored sintered metal, so that on the one hand a smooth surface is obtained and at no point is the necessary support for the workpieces lacking, whilst on the other hand a vacuum can be transferred, i.e., an air passage is possible.

A closed vacuum channel or duct 7 is located laterally of the magnetic chuck and a tube 9 with a seal 8 can be moved backwards and forwards therein.

It is clear from FIGS. 1 and 2 that on transferring a vacuum with the aid of tube 9, the two first (to the far left) vacuum connecting lines 6 are supplied with vacuum. Correspondingly the vacuum is also active in the two left-hand magnetic pole pieces 1 via bores 3. The other, further right magnetic pieces are only supplied with vacuum if tube 9 is correspondingly moved to the right. Between the individual magnetic pole pieces 1 is located the pole pitch 2 of non-ferromagnetic material, e.g. brass, so that the juxtaposed nort and south poles are magnetically separated from one another. A stop bar 10 is provided for the not shown workpiece.

In the embodiment according to FIGS. 3 and 4 the pole pitches and slots are combined, i.e. the slots between the individual magnetic pole pieces 1 are partly filled with a sintered metal 11 (cf. FIG. 4), which permits a vacuum transfer and simultaneously is not ferromagnetic. The further downward portion 12 of the pole pitches is filled with a normal, non-porous and non-ferromagnetic material.

It becomes clear from observing FIG. 4 that the closed vacuum channel is positioned alongside pole piece 1, which is made from sintered metal 11, so that corresponding to the position of tube 9 vacuum can be transferred to the individual pole pitches 11 filled with the sintered metal.

Figure 5:
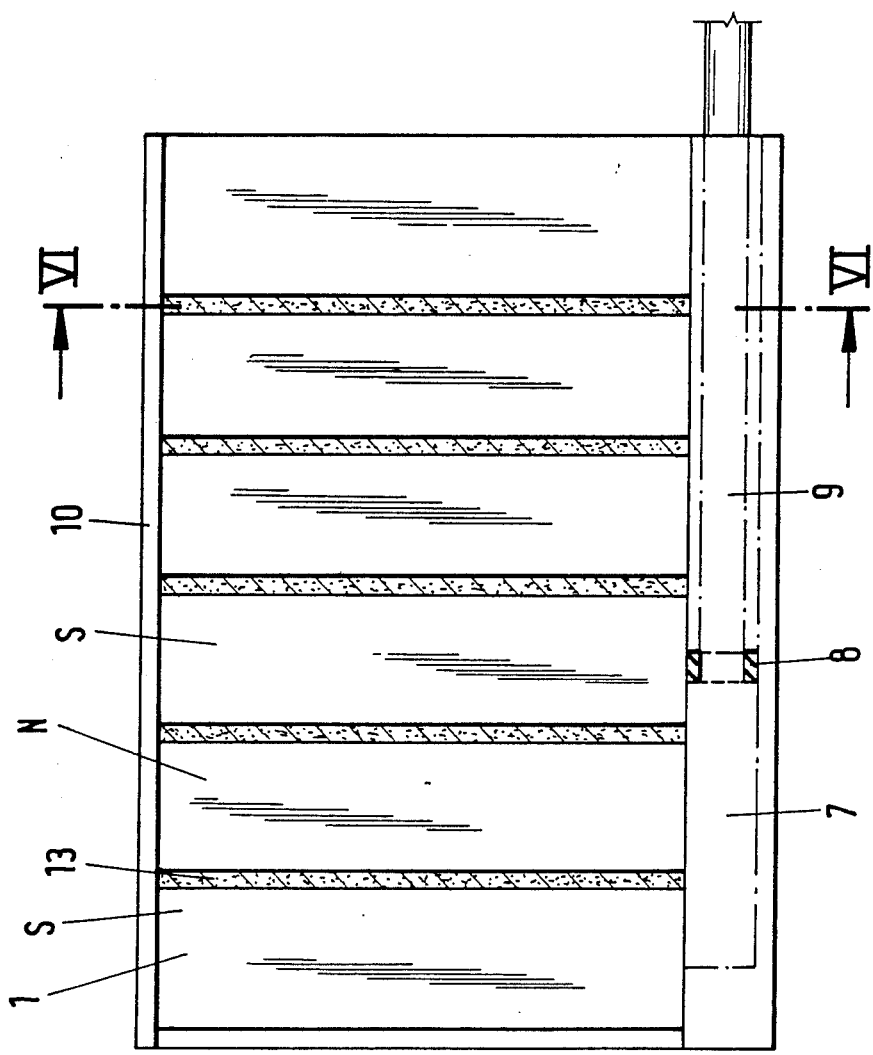
FIG. 5 is a plan view of another embodiment of a chuck according to the invention.

The embodiment according to FIGS. 5 and 6 differs from that of FIGS. 3 and 4 in that the entire slot forming the pole pitch is filled with a non-ferromagnetic sintered metal 13.

In the case of the embodiment according to FIGS. 7 and 8, a relatively narrow, through slot 15 is formed in the pole pitches 14 of non-ferromagnetic material. The closed channel 7 passes through the slots and the tube can be correspondingly moved backwards and forwards therein. In this embodiment there is no sintered metal in slot 15.

The embodiment according to FIGS. 7 and 9 differs from that according to FIGS. 3 and 4 in that additionally transversely directed slots 16 are provided, which are filled with fine-pored sintered metal. In this embodiment, tube 9 is not displaceable and instead supplies the vacuum channel 7 over the entire length thereof.

The embodiment of FIGS. 11 and 12 is a variant of the embodiment according to FIGS. 7 and 8. In addition to the slots 15, there are transversely directed slots 17, which are not filled with the sintered metal. These slots can optionally be closed by elastic gasket cords, so that only individual portions are supplied with vacuum, i.e. they close the slots where there is no workpiece. It is fundamentally also possible to cover the exposed slots or sintered metal portions, which are not covered by a workpiece, but supplied with vacuum, e.g. by using a plastics film or a ferromagnetic material cover.

It is common to all the embodiments that, in addition to the magnetic force, a vacuum can be applied, so as to ensure additional force or in order to permit the universal use of the chuck, because it is also possible to hold or retain weakly magnetizable or even non-magnetic workpieces.

I claim:

1. A combined vacuum-magnetic chuck for chucking workpieces comprising:
    a plurality of magnetic pole pieces arranged side by side with alternating North and South polarity and collectively forming a substantially planar chucking surface;
    a pole pitch disposed between each two adjacent magnetic pole pieces;
    a plurality of vacuum openings formed in at least one of the magnetic pole pieces and being connected to at least one vacuum line; and
    a fine-pored sintered metal filling the plurality of openings and thus constituting part of the chucking surface.

2. A combined vacuum-magnetic chuck according to claim 1, wherein the sintered metal is ferro-magnetic.

3. A combined vacuum-magnetic chuck according to claim 1, wherein the at least one vacuum line comprises a closed vacuum channel in which a feed tube is longitudinally displaceable, substantially horizontal vacuum connected lines leading to the openings and which are substantially perpendicular to the closed vacuum channel.

4. A combined vacuum-magnetic chuck according to claim 1, wherein the plurality of openings are formed as slots.

5. A combined vacuum-magnetic chuck according to claim 1, wherein the plurality of openings are bores formed in the plurality of magnetic pole pieces.

6. A combined vacuum-magnetic chuck for chucking a workpiece, comprising:
    a plurality of magnetic pole pieces arranged side by side with alternating North and South polarity, a space being formed between each two adjacent pole pieces;
    a vacuum line in communication with each of the spaces; and
    a fine-pored sintered metal filling each of the spaces and forming a plurality of strips functioning as pole pitches between every two adjacent pole pieces, the sintered metal strips and plurality of magnetic pole pieces collectively forming a continuous chucking surface.

7. A combined vacuum-magnetic chuck according to claim 6, wherein the vacuum lines comprises a closed vacuum channel in which a feed tube is longitudinally displaceable, the strips being substantially at right angles to the vacuum channel.

* * * * *